(12) United States Patent  
Benckenstein et al.

(10) Patent No.: US 7,609,031 B2
(45) Date of Patent: Oct. 27, 2009

(54) METHOD FOR BALANCING LITHIUM SECONDARY CELLS AND MODULES

(75) Inventors: Claude Leonard Benckenstein, Sugar Land, TX (US); David Allen White, Stafford, TX (US)

(73) Assignee: Southwest Electronic Energy Corporation, Stafford, TX (US)

( * ) Notice: Subject to any disclaimer, the term of this patent is extended or adjusted under 35 U.S.C. 154(b) by 0 days.

(21) Appl. No.: 12/195,274

(22) Filed: Aug. 20, 2008

(65) Prior Publication Data

US 2008/0309288 A1 Dec. 18, 2008

Related U.S. Application Data

(63) Continuation-in-part of application No. 11/560,288, filed on Nov. 15, 2006, which is a continuation-in-part of application No. 11/293,432, filed on Dec. 2, 2005, now Pat. No. 7,279,867.

(60) Provisional application No. 61/054,882, filed on May 21, 2008.

(51) Int. Cl.
*H02J 7/00* (2006.01)
*H02J 9/00* (2006.01)

(52) U.S. Cl. .................. 320/118; 320/120; 320/117; 320/116; 320/124; 320/122; 307/66

(58) Field of Classification Search ............. 320/101, 320/116, 117, 118, 124, 122, 128, 150
See application file for complete search history.

(56) References Cited

U.S. PATENT DOCUMENTS 5,952,815 A * 9/1999 Rouillard et al. ............ 320/116
6,157,169 A * 12/2000 Lee ............................. 320/132
6,288,489 B1   9/2001 Isohata et al.
7,279,867 B2  10/2007 Benckenstein, Jr. et al.

* cited by examiner

*Primary Examiner*—Edward Tso
*Assistant Examiner*—Yalkew Fantu
(74) *Attorney, Agent, or Firm*—Buskop Law Group, PC; Wendy Buskop

(57) ABSTRACT

A battery pack control module for balancing a plurality of lithium secondary cells or groups of lithium secondary cells connected in series and method of use.

25 Claims, 3 Drawing Sheets

METHOD FOR BALANCING LITHIUM SECONDARY CELLS AND MODULES

CROSS REFERENCE TO RELATED APPLICATION

This application is a Continuation in Part of co-pending U.S. Provisional Application Ser. No. 61/054,882 filed on May 21, 2008. This application is also a Continuation in Part of co-pending U.S. patent application Ser. No. 11/560,288 filed Nov. 15, 2006, which is a Continuation in Part of co-pending U.S. patent application Ser. No. 11/293,432 filed on Dec. 2, 2005. These applications are incorporated herein.

FIELD

The present embodiments relate to a system for balancing a plurality of lithium secondary cells or groups of cells connected in series.

BACKGROUND

A need exists for a system for balancing cells or groups of cells that balances states of charge of the battery pack control modules automatically, without requiring manual balancing during maintenance operations.

A further need exists for a system for balancing battery pack control modules in which each battery pack control module is independently self-balancing, without requiring communication with a master controller or other battery pack control modules, obviating the need for a costly centralized master controller, and the need for complex interconnection between battery pack control modules.

A need also exists for a system for balancing battery pack control modules that enables individual battery pack control modules and groups of battery pack control modules to be selectively removable and replaceable, without interrupting charging of other battery pack control modules.

The present embodiments meet these needs.

BRIEF DESCRIPTION OF THE DRAWINGS

The detailed description will be better understood in conjunction with the accompanying drawings as follows.

Figure 1:
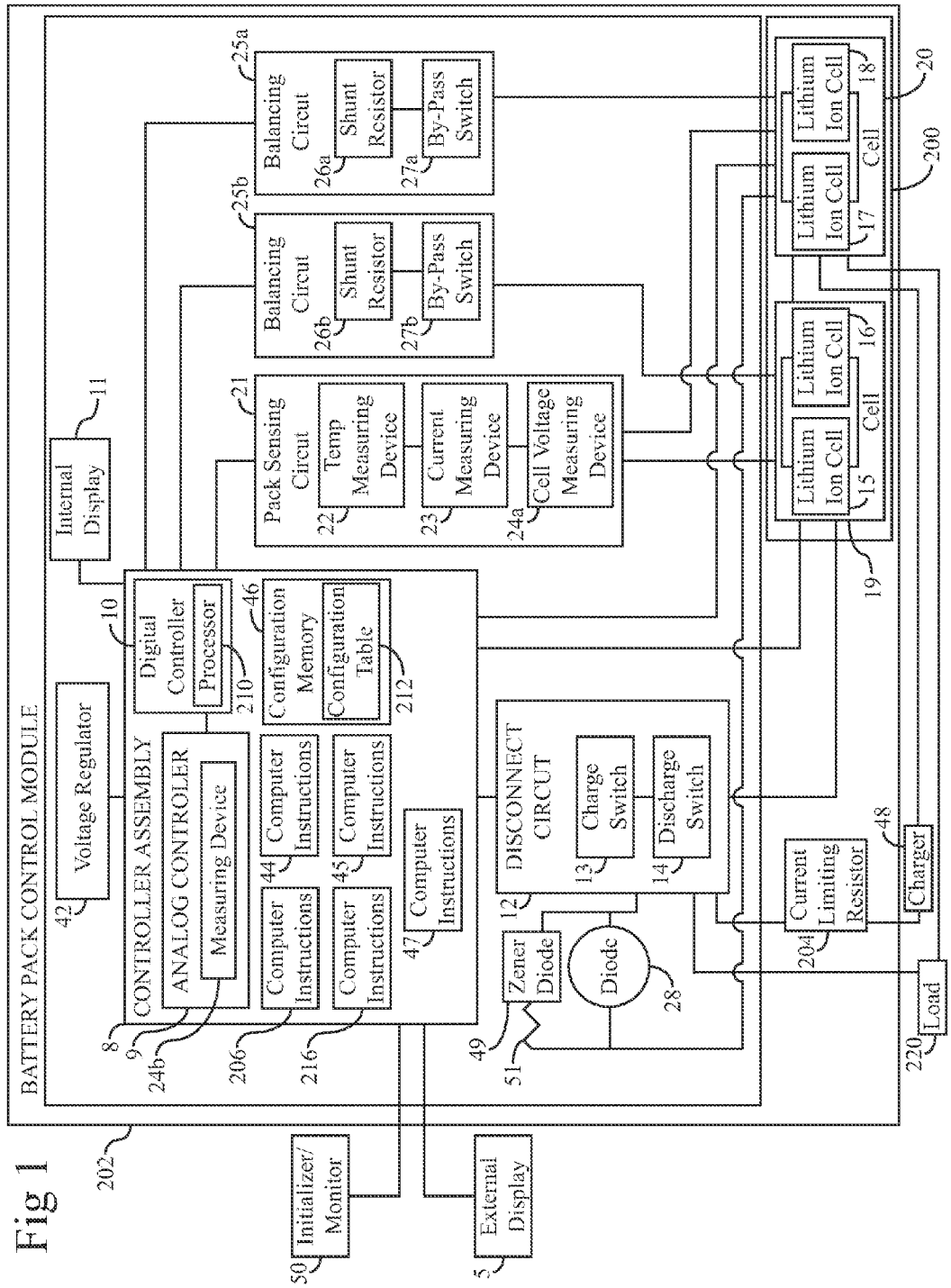
FIG. 1 depicts a diagram of an embodiment of a battery pack control module useable with the present system.

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The present embodiments relate to a battery pack control module. The present system is also useable to balance multiple groups of cells, namely lithium ion secondary. A battery pack control module can be connected to other groups of battery pack control modules in series.

Conventional battery pack control modules must be balanced manually, by interrupting operation of equipment powered by the battery pack system, fully discharging each cell or group of cells controlled by the module, then simultaneously charging. Manual balancing operations are tedious, time consuming, and costly, and are therefore typically undertaken no more often than once every six months.

These special maintenance operations are often not performed due to inattention to detail or a lack of time, manpower, or other resources necessary to perform the manual balancing operations. Failure to perform these balancing operations can allow cells within a group of cells connected in series to attain unbalanced states of charge, potentially damaging one or more parts of the modules and any connected equipment, and creating a safety hazard to operators of the cells.

In one non-limiting embodiment, the battery pack control module for balancing lithium secondary cells or groups of lithium secondary cells can contain a controller assembly for controlling the operation of the battery pack control module. A disconnect circuit can engage the controller assembly as well as a plurality of lithium secondary cells or groups of lithium secondary cells connected in series. This disconnect circuit can include a charge switch and a discharge switch.

A pack sensing circuit connects the controller assembly and the plurality of lithium secondary cells or groups of lithium secondary cells connected in series. The pack sensing circuit can include a temperature measuring device, a current measuring device, and a cell voltage measuring device, or any combinations of these measuring devices.

A balancing circuit connects the plurality of lithium secondary cells or groups of lithium secondary cells connected in series to the controller assembly. The module may operate with more than one balancing circuits, where each balancing circuit includes a shunt resistor connected to a bypass switch.

A power source for charging the plurality of cells or groups of cells is also connected to the controller assembly.

The current limiting resistor connected to the power source limits current from the plurality of lithium secondary cells or groups of lithium secondary cells connected in series while charging.

There may be stored in the configuration memory of the module at least one configuration table containing specifications of the lithium secondary cells disposed within the module. The controller assembly can also contain a set of computer instructions for instructing the controller assembly to monitor the state of charge for the plurality of lithium secondary cells or groups of lithium secondary cells connected in series.

The controller assembly can contain a second set of computer instructions for controlling the disconnect circuit in conjunction with the balancing circuit and for applying a voltage from the power source via the charge switch and via the discharge switch to a lithium secondary cell or groups of lithium secondary cells and for applying a voltage from a lithium secondary cell or groups of lithium secondary cells via the charge switch and via the discharge switch to a load if a predetermined state of charge has not been reached or is exceeded.

Additionally, the controller assembly can contain another set of computer instructions for measuring the state of charge for each lithium secondary cell after each application of voltage. If a predetermined state of charge is reached for each lithium secondary cell this set of instructions can actuate at least a partial discharge of one or more lithium secondary cells simultaneously, enabling simultaneous discharge of one or more lithium secondary cells while one or more lithium secondary cells is charging or discharging or quiescent, or in storage. In an embodiment, charging can be stopped by the disconnect circuit when discharge happens.

The controller assembly can include an analog controller and a digital controller.

The digital controller can include at least one processor.

A protective diode can connect to the plurality of lithium secondary cells or groups of lithium secondary cells connected in series and to the disconnect circuit. This protective diode can be a reverse voltage protection diode or a bypass diode for preventing excessive voltage from developing across the controller assembly.

A second diode can be used for balancing the plurality of lithium secondary cells or groups of lithium secondary cells by discharging at least one lithium secondary cell or group of lithium secondary cells or charging at least one lithium secondary cell or group of lithium secondary cells until a balance phase for the connected cells is achieved.

The controller assembly can be configured with computer instructions for instructing the processor to customize specifications of the battery pack control module using the design parameters of the lithium secondary cell.

The display device is operatively connected to the controller assembly so that computer instructions stored on the control assembly may control the display for displaying the state of charges. The display device can be a plurality of light emitting diodes, a liquid crystal display, a plasma display, and combinations thereof.

The controller assembly further can contain computer instructions for instructing the processor to display an absolute state of charge by counting coulombs.

The power source can be a rechargeable battery, a fuel cell, a solar panel, a hydroelectric source or other electric power supply.

The power source can be a one or more capacitors, one or more supercapacitors, one or more other electrochemical cells, or combinations thereof.

The protective diode can include a zener diode connected in series with a current limiting resistor located between a high charge lithium secondary cell or group of lithium secondary cells and a different charge lithium secondary cell or group of lithium secondary cells. The zener diode can be used to bypass the disconnect circuit in an embodiment.

The by-pass switch can be a semiconductor switch, a variable resistor, a mini-micro switch or combinations thereof.

The cell voltage measuring device can measure voltage between lithium secondary cells, between groups of lithium secondary cells, or at other locations.

The temperature measuring device, the current measuring device or both can be external to the controller assembly.

The digital controller can have one or more analog I/O ports, one or more digital I/O ports, and memory with processing logic.

The controller assembly can contain instructions for connecting the plurality of lithium secondary cells or groups of lithium secondary cells connected in series to the power supply, for connecting the plurality of lithium secondary cells or groups of lithium secondary cells connected in series to a load, or for disconnecting the plurality of lithium secondary cells or groups of lithium secondary cells.

Two or more battery pack control modules can be connected together in series or in parallel to form a battery pack system.

The module can contain a voltage regulator for powering the controller assembly.

One or more of the plurality of lithium secondary cells or groups of cells can be lithium ion cells.

In an embodiment, the method can be for extending the power duration for lithium secondary cells or groups of lithium secondary cells connected in series.

The method can include the step of monitoring and measuring parameters for lithium secondary cells or groups of lithium secondary cells connected in parallel, or groups of lithium secondary cells connected in series, to determine a state of charge for the lithium secondary cells or groups of lithium secondary cells.

The method can include the step of removing at least a portion of a charge from at least one of the lithium secondary cells or groups of lithium secondary cells to achieve a balanced state of charge for the lithium secondary cells connected in series, or groups of lithium secondary cells connected in series, in a discharge phase, a charge phase, a quiescent phase, and a storage phase using a digital controller to execute computer instructions.

Instructions on the digital controller can include instructions for monitoring the state of charge for the lithium secondary cells or groups of lithium secondary cells.

The digital controller can also contain instructions for controlling a disconnect circuit connected to a controller assembly while controlling a balancing circuit connected to the cells or groups of cells. A voltage can be applied from a power source to a charge switch that is part of the disconnect circuit if a predetermined state of charge has not been reach. The digital controller can also contain instructions for discharging voltage from a cell or groups of cells if a predetermined state of charge has been exceeded.

Instructions on the digital controller can also include instructions to measure a state of charge for each cell or groups of cells after each application of voltage and prevent application of voltage if a predetermined state of charge is reached for each cell or groups of cells enabling at least partial discharge of one or more cells or groups of cells simultaneously while one or more cells or groups of cells is charging, or discharging, or is quiescent, or is in storage.

The temperature of lithium secondary cells or groups of lithium secondary cells can be measured or monitored with a measuring device. Additionally, the current or voltage or any combination of the temperature, current and voltage of the lithium secondary cells or groups of lithium secondary cells can be measured or monitored.

Certain embodiments of the present invention can include a configuration table to customize the balancing of the state of charge for the lithium secondary cells or groups of the lithium secondary cells.

The method can include the step of connecting the plurality of lithium secondary cells or groups of lithium secondary cells together in series to form at least one battery pack system.

The method can include the step of preventing excessive voltage from developing across the lithium secondary cells or groups of lithium secondary cells.

The method can include the step of removing a portion of the charge for at least one lithium secondary cell or at least one group of lithium secondary cells until the balance state is achieved using a disconnect circuit and a diode.

A diode can be utilized in accordance with certain embodiments of this invention to protect the circuit between the cells.

In one aspect, embodiments on the present system advantageously enable a plurality of lithium secondary cells or groups of cells connected in series to independently and automatically attain a balanced state of charge during a normal charge phase, without requiring separate special maintenance operations. Through use of the present system, the costly and time consuming needs for manual balancing of the battery pack control modules is removed entirely.

An embodiment can contemplate using zener diodes connected in series with current limiting resistors to enable current from a power source to automatically bypass a cell or group of cells that have attained a predetermined state of charge. By enabling the bypass of charged cells, the zener diodes enables the charging of other adjacent cells connected in series within a system that have not yet attained the predetermined state of charge. The present module can automatically create a balanced state of charge within multiple cell system once each cell or group of lithium secondary cells has attained the predetermined state of charge.

An embodiment can utilize computer instructions for measuring the state of charge of a cell, disconnecting a charge switch, and actuating shunt resistors within balancing circuits to partially discharge cells or groups of cells that have attained a predetermined state of charge. Shunting can be performed until cells or groups of cells reach a hysteresis state of charge, at which time the charge switch can be reconnected and charging can resume.

By automatically partially discharging cells or groups of cells that have reached the predetermined high state of charge, the simultaneous charging of each cell within a group of cells can be continued without exceeding the predetermined state of charge for any single cell.

This embodiment of the present system produces an oscillating state of charge within a group of cells, whereby once a battery pack control module has attained a predetermined high state of charge, the battery pack control module is partially discharged, then charged simultaneously with other battery pack control modules connected in series. Once all battery pack control modules within a battery pack system are charged to the predetermined high state of charge, creating a balanced system, it is contemplated that all of the battery pack control modules exhibit an oscillating state of charge simultaneously, through partial discharge using the balancing circuits, then simultaneous charging from a power source.

It is contemplated that in an embodiment, the use of computer instructions to automatically cause the partial discharge of battery pack control modules that have reached a predetermined high state of charge can be coupled with use of zener diodes connected to current limiting resistors. Using this embodiment, during discharge of a charged battery pack control module, current can continue to charge other battery pack control modules connected in series by bypassing the discharging module through use of a zener diode, providing enhanced efficiency over the use of zener diodes or partial discharge alone.

The present system provides the advantage of enabling constant and continuous balancing of a plurality lithium secondary cells or groups of lithium secondary cells connected in series, automatically, each time a battery module is charged. Typical balancing operations are only performed once every six months, or even less frequently, generating a greater risk that a battery pack system will become unbalanced as time passes.

By enabling automatic balancing of a plurality lithium secondary cells or groups of lithium secondary cells connected in series, use of a battery pack control module balancing resistor, typically required for conventional balancing operations, is not necessary. Attachment of a balancing resistor can be disruptive to normal operation of a battery pack system.

Conventional systems require that each battery pack control module within a system communicates with one another through complex interconnections, or through a costly centralized master controller. The present system enables each battery pack control module to independently attain a balanced state of charge with other battery pack control modules connected in series, without requiring centralized monitoring or control, and without requiring any of the battery pack control modules to communicate with any other module.

The present system thereby provides the benefit of increased battery pack system design flexibility, while retaining battery pack control module balance. Because each battery pack control module is independent of one another, battery pack control modules within a battery pack system can be removed and reconfigured in a modular fashion, allowing nearly unlimited flexibility in battery pack system design configurations.

The present system further provides the advantage of enabling lithium secondary cells and groups of lithium secondary cells connected in series to be charged to a predetermined state of charge, such as 80 percent of the maximum capacity for secondary cell. By permitting balancing of lithium secondary cells at selected predetermined states of charge, the lifespan of cells is prolonged significantly. Typical rechargeable cells can be fully charged to their maximum capacity, and then fully discharged, approximately 1,000 times. By charging and balancing at a predetermined state of charge, using the present system, each cell is contemplated to have a life expectancy ranging from about 2,000 charging cycles to about 10,000 charging cycles, or more.

Additionally, maintaining a lithium secondary cells at a predetermined level of charge, such as 80 percent of maximum capacity, can increase useable life for a battery pack control module used in a mode where there are infrequent charge/discharge cycles, such as a back-up mode, from a typical useable life of about 1 year to about 2 years to a greater useable life of about 5 years to about 10 years.

Referring now to FIG. 1, a diagram of an embodiment of a battery pack control module (202) useable with the present system is depicted.

The battery pack control module (202) is useable to internally monitor and balance states of charge of a plurality of individual lithium secondary cells or groups of lithium secondary cells connected in series (200). The battery pack control module (202) as contemplated herein can be used for each of a plurality of individual lithium secondary cells connected in series or for groups of cells connected in series. The battery pack control module (202) is also useable to monitor and balance groups of lithium secondary cells connected in parallel, where the groups of cells connect to other groups of lithium secondary cells in series.

A load (220) is generally illustrated in FIG. 1 as being connected between the secondary cells (200) and the battery pack control module (202). It should be appreciated the load (220) represents the energy consuming device powered by the secondary cells (200).

The battery pack control module (202) can include a controller assembly (8) for measuring parameters and controlling a disconnect circuit (12) and balancing circuits (25*a*, 25*b*) responsive to parameters measured by the controller assembly (8) and a pack sensing circuit (21).

A voltage regulator (42), such as a DC programmable voltage regulator made by Linear Technology, Inc. of Malpitas, Calif., can be used to power the controller assembly (8).

The battery pack control module (202) is shown having a protective diode (28), which can be a reverse voltage protection diode or a bypass diode, useable to protect cells within the depicted battery pack control module from excessive voltage. Bypass diodes such as those manufactured by ON Semiconductor of Phoenix, Ariz. or Vishay of Malvern, Pa. can be contemplated for use herein. The protective diode (28) is connected to the disconnect circuit (12), and to a first group of cells (20).

For example, the protective diode (28) can prevent damage to the disconnect circuit (12) by shunting damaging negative voltage transients around the disconnect circuit (12).

The disconnect circuit (12) is depicted having a charge switch (13) and a discharge switch (14), which can be transistor switches, such as a Vishay P-FET switch, made by Vishay of Malvern, Pa., or similar types of switches. The disconnect circuit (12) is depicted in communication with a second group of cells (19).

The first group of lithium secondary cells (20) is shown having a first lithium secondary cell (17) and a second lithium secondary cell (18) connected in parallel. The first group of cells (20) is connected in series to the second group of cells (19). The second group of cells (19) is shown having a third lithium secondary cell (15) and a fourth lithium secondary cell (16) connected in parallel.

While each group of cells (19, 20) is shown including two individual cells connected in parallel, it is contemplated that a group of cells can have any number of cells, such as from about one cell to about four cells, or more.

FIG. 1 depicts each of the cells (15, 16, 17, 18) as lithium secondary cells, such as lithium secondary cells having a nominal voltage of 3.7 volts made by Tianjin Lishen Battery Joint-Stock Co. Ltd., of Tianjin Huayuan, China. It is contemplated that the present system can be useable with any type of rechargeable cell, including; nickel cadmium cells, nickel metal hydride cells, lead acid cells, and other similar rechargeable cells.

In an embodiment, one or more battery pack control modules can include one or more capacitors, one or more supercapacitors, one or more electrochemical cells, such as fuel cells, or combinations thereof, in addition to the plurality of cells (15, 16, 17, 18). The one or more capacitors, one or more supercapacitors, one or more electrochemical cells, or combinations thereof can also be included in place of the plurality of cells (15, 16, 17, 18).

A zener diode (49), such as a high power zener diode manufactured by ON Semiconductor of Phoenix, Ariz., is shown connected in series with a current limiting resistor (51), such as a current limiting resistor having a power capability of five watts or more, manufactured by Vishay of Malvern, Pa. The zener diode (49) and current limiting resistor (51) are connected in parallel to the protective diode (28) and are shown in communication with the disconnect circuit (12).

It is contemplated that the zener diode (49) and current limiting resistor (51) are disposed between adjacent lithium secondary cells or groups of lithium secondary cells connected in series. The zener diodes are thereby contemplated to permit the flow of current from a power source, shown in FIG. 1 as a charger (48) through a lithium secondary cell or group of lithium secondary cells connected in series that has reached a predetermined state of charge without charging the cell or group of cells, thereby allowing the charging of other lithium secondary cells or groups of lithium secondary cells connected in series. The charger (48) can generally be understood to be a power source.

The zener diode (49) is contemplated to permit the flow of current that would otherwise be stopped by actuation of the disconnect circuit (12), enabling charging of other cells or groups of cells in series with the depicted groups of lithium secondary cells. For example, when the disconnect circuit (12) is actuated, a current of 250 ma can be permitted to flow through the current limiting resistor (51) and the zener diode (49) to charge one or more adjacent cells or groups of cells.

The controller assembly (8) is shown having an analog controller (9), such as Part Number BQ29312A, available from Texas Instruments of Dallas, Tex., and a digital controller (10). The digital controller (10) can include analog and digital input/output ports, a processor (210), which can be a microprocessor, memory, which can include flash memory and processing logic located in the memory, and computer instructions for executing balancing, measuring, charging, and discharge functions.

The analog controller (9) is shown having a measuring device (24), which is contemplated to measure the voltage of individual cells or groups of cells within the battery pack control module, or the voltage of the entire battery pack control module.

The controller assembly (8) is in communication with the pack sensing circuit (21), which is shown having a current measuring device (23) and a temperature measuring device (22). The voltage, current, and temperature measurements obtained using the measuring devices (22, 23) can be used by the digital controller (10) to obtain the state of charge of the lithium secondary cells. The digital controller (10) may contain a processor (210) for storing data and executing computer instructions. The state of charge can be related to voltage, current, and/or temperature as relative capacity through data tables within configuration memory (46). More specifically, the configuration memory (46) can contain a computer instructions (216) including a configuration table (212) with the properties of the lithium secondary cells. The computer instructions (216) can utilize the specific properties provided in the table to customize the balancing of the state of charge for the lithium secondary cells or groups of lithium secondary cells. Lithium secondary cell properties contained within the configuration table (212) can include, but may not be limited too: maximum allowable voltages; minimum allowable voltages; and the impedance of the lithium secondary cells.

It is contemplated that the pack sensing circuit (21) can contain a temperate measuring device (22) for measuring temperatures ranging from about −50 degrees Centigrade to about 85 degrees Centigrade or more. The pack sensing circuit (21) can contain a current measuring device (23) for measuring current ranging from about 0 ma to about 16,000 ma or more. Additionally, the pack sensing circuit (21) can contain a voltage measuring device (24a) for measuring voltages on the lithium secondary cells ranging from about 0 V to 18 about V or more.

The state of charge indicates the percent charge of the battery pack control module relative to the nominal maximum charge of the battery pack control module. The state of charge can also be measured as absolute capacity by additionally measuring the time average current into and out of the entire battery pack control module to obtain the number of amperage hours remaining in the battery pack control module.

In an embodiment, the measured state of charge of the battery pack control module can be an absolute state of charge determined by counting coulombs, such as an absolute capacity of 24 ampere hours based on the flow of coulombs to and from a load and a power source.

The state of charge and status of the battery pack control module can be acquired and externally displayed using an initializer or display device (50), such as a monitor made by Hewlett Packard of Palo Alto, Calif., depicted in communication with the controller assembly (8). More specifically, the controller assembly (8) can contain computer instructions (206) for instructing the processor (210) to display the state of charges on the external display device (5).

The state of charge and status of the battery pack control module can be externally displayed using an external display device (5). The external display device (5) can include one or more light emitting diodes, a liquid crystal display, a plasma display or combinations thereof. Use of a liquid crystal display can be contemplated to be advantageous for applications when lower power consumption is required, such as military applications.

An internal display (11), one or more light emitting diodes, a liquid crystal display, a plasma display or combinations thereof, is shown in communication with the controller assembly (8). The internal display (11) and the external display (5) are useable separately or together to visibly display status and capacity parameters of the battery pack control module for use by operators and other users.

A first balancing circuit (25a) having a first shunt resistor (26a) and a first by-pass switch (27a) is shown in communication with the controller assembly (8) and the first group of cells (20). A second balancing circuit (25b) having a second shunt resistor (26b) and a second by-pass switch (27b) is shown in communication with the controller assembly (8) and the second group of cells (19). The by-pass switches (27a, 27b) can include semiconductor switches, variable resistors, mini-micro switches, or combinations thereof.

The balancing circuits (25a, 25b) are contemplated to be useable to balance the states of charge of the groups of cells (19, 20). The balancing circuits (25a, 25b) are also contemplated to be useable to at least partially discharge the depicted lithium secondary cells to facilitate balancing of a plurality of lithium secondary cells connected in series.

FIG. 1 depicts a power source (48), which is shown as a charger, connected to the first group of cells (20) and to the disconnect circuit (12). A current limiting resistor (204) is connected between the power source (48) and the disconnect circuit (12) for limiting current from any lithium secondary cells. The power source (48) can include any type of current limited and voltage limited power source, including one or more solar panels, fuel cells, or any other current limited power supply with voltage foldback, such as a Lambda GENH 40-19 or the equivalent.

The controller assembly (8) can include computer instructions (44), which can be stored in flash memory or using other means, for instructing the processor of the digital controller (10) to actuate and de-actuate the disconnect circuit (12) in response to voltage, current, and temperature measurements obtained from the measuring devices (22, 23, 24).

The computer instructions (44) can also instruct the processor of the digital controller (10) to actuate and de-actuate the balancing circuits (25a, 25b) and the disconnect circuit (12) to balance states of charge of the groups of cells (19, 20), allowing the safe charge and internal balancing of the cells within the depicted battery pack control module.

The controller assembly (8) can further include configuration memory (46), such as flash memory, that can be loaded by the initializer or display device (50), that contains battery pack control modules design parameters, such as cell chemistry parameters, application parameters, charge parameters, discharge parameters, and other similar parameters including the design parameters of the lithium secondary cells. The provision of the configuration memory (46) enables the designing of battery pack control modules with unique specifications and characteristics.

The controller assembly (8) can further include computer instructions (45), which can be stored in flash memory or using other means, which are used to balance the state of charge of the depicted battery pack control module with that of other battery pack control modules connected to the depicted battery pack control module in series.

The computer instructions (45) are contemplated to instruct the processor of the digital controller (10) to measure the state of charge of the lithium secondary cells using one or more of the measuring devices (22, 23, 24) and display the state of charge on the initializer or display device (50).

The computer instructions (45) can also instruct the processor of the digital controller (10) to actuate and de-actuate the charge switch (13) of the disconnect circuit (12) when the lithium secondary cells or groups of secondary lithium cells reach a predetermined state of charge. For example the charge switch (13) can be actuated when lithium secondary cell reaches a predetermined state of charge of about 80 percent to about 85 percent relative capacity, the predetermined charge selected to prolong the life of the lithium secondary cell as well as the battery.

The computer instructions (45) can further instruct the processor of the digital controller (10) to actuate and de-actuate the by-pass switches (27a, 27b) of each of the balancing circuits (25a, 25b) when the lithium secondary cells reach the predetermined state of charge, thereby at least partially discharging secondary lithium cells using the shunt resistors (26a, 26b).

The present system thereby utilizes the shunt resistors (26a, 26b) for the dual purposes of balancing the state of charge of individual cells within the battery pack control module, and for at least partially discharging all cells of the battery pack control module to balance the state of charge of the battery pack control module with that of other battery pack control modules connected in series.

The computer instructions (45) can be contemplated to actuate the shunt resistors (26a, 26b) of each balancing circuit (25a, 25b) when a secondary lithium cell or group of secondary lithium cells are charged to a predetermined high state of charge, causing discharge of the secondary lithium cell or group of secondary lithium cells, and to de-actuate the shunt resistors (26a, 26b) to cease the discharge of the secondary lithium cell or group of secondary lithium cells when the secondary lithium cell or group of secondary lithium cells have been discharged to a predetermined hysteresis charge.

For example, when a secondary lithium cell or group of secondary lithium cells reach a predetermined high state of charge of about 85 percent relative capacity, each balancing circuit within the battery pack control module can be actuated to discharge the secondary lithium cell or group of secondary lithium cells to a hysteresis charge of about 83 percent relative capacity, at which time the balancing circuits can be de-actuated to cease discharge of the secondary lithium cell or group of secondary lithium cells.

The controller assembly (8) can further include computer instructions (47), which can be stored in flash memory, or using other means. The computer instructions (47) can provide for the controller assembly (8) to measure the state of charge for each lithium secondary cell after each application of voltage. If a predetermined state of charge is reached for each lithium secondary cell, at that time the computer instructions (47) can actuate at least a partial discharge of one or more lithium secondary cells simultaneously, enabling simultaneous discharge of one or more lithium secondary cells while one or more lithium secondary cells is charging.

Figure 2:
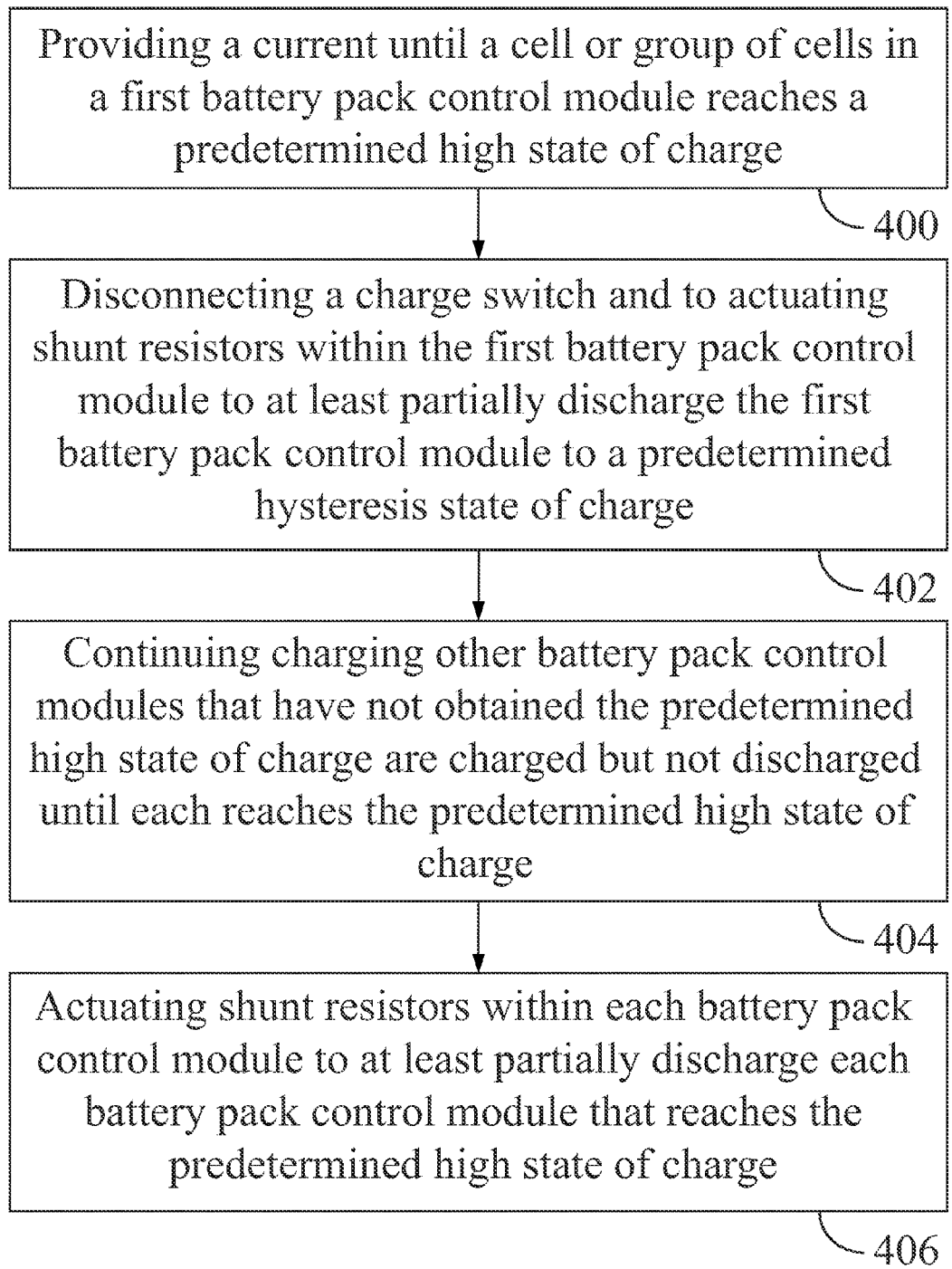
FIG. 2 depicts a diagram of an embodiment of a method useable with an alternate embodiment of the present system.

FIG. 2 depicts a diagram showing an embodiment where the current is provided to a battery pack system containing multiple battery pack control modules until a secondary lithium cell or a group of secondary lithium cells in a first battery pack control module reaches a predetermined high state of charge (400).

Computer instructions within the first battery pack control module are then used to disconnect the charge switch and to actuate shunt resistors within the first battery pack control module to at least partially discharge the first battery pack control module to a predetermined hysteresis state of charge (402). This action prevents battery pack control module cells from over charging and provides for initiation of charge/discharge cyclic oscillation.

Continued charging of the first battery pack control module is thereby able to be resumed, then stopped as the first battery pack control module is at least partially discharged in a cyclic charge/discharge oscillating fashion, such that the first battery pack control module oscillates between the predetermined high state of charge and the hysteresis state of charge continuously, as long as a charge source is connected.

Other battery pack control modules that have not obtained the predetermined high state of charge are charged but not discharged until each reaches the predetermined high state of charge (404).

At that time, computer instructions are used to actuate shunt resistors within each battery pack control module to at least partially discharge each battery pack control module that reaches the predetermined high state of charge (406). The battery pack system is balanced once each module has reached the predetermined high state of charge and begins its charge/discharge oscillation.

Once all battery pack control modules within a battery pack system are charged to the predetermined high state of charge, creating a balanced system, it is contemplated that all of the battery pack control modules exhibit an oscillating state of charge simultaneously, through partial discharge to a hysteresis state of charge using the shunt resistors, then simultaneous charging until the predetermined high state of charge is again reached.

Figure 3:
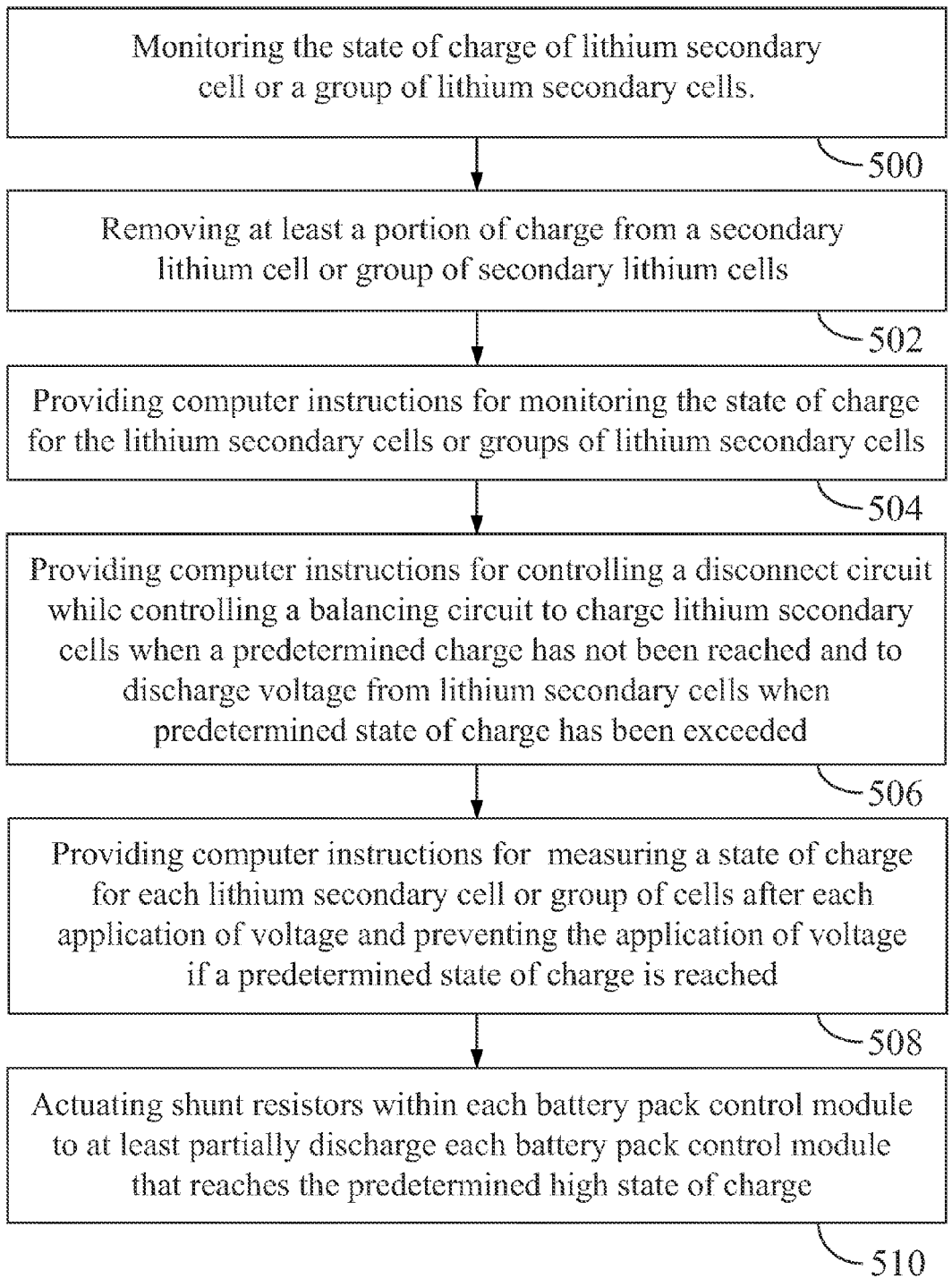
FIG. 3 depicts an embodiment of the present method useable with an alternate embodiment of the present system.

FIG. 3 depicts an embodiment of the present method for extending power duration for lithium secondary cells or groups of lithium secondary cells connected in series. The groups of lithium secondary cells can include parallel cells which are then connected in series.

At step 500 lithium secondary cells or groups of lithium secondary cells, which may be groups of parallel secondary cells connected in series, are monitored and measured to determine their state of charge.

At step 502 a digital controller executes computer instructions to remove at least a portion of a charge from at least one of the lithium secondary cells or groups of lithium secondary cells to achieve a balanced state of charge for the lithium secondary cells connected in series, or groups of lithium secondary cells connected in series, in a discharge phase, a charge phase, a quiescent phase, and a storage phase.

The computer instructions can instruct the processor to perform the following steps:
  monitor the state of charge for the lithium secondary cells or groups of lithium secondary cells (504);
  control a disconnect circuit connected to a controller assembly while controlling a balancing circuit connected to the lithium secondary cells or groups of lithium secondary cells to apply voltage from a power source to a charge switch that is part of the disconnect circuit; or discharge voltage from a lithium secondary cell or groups of lithium secondary cells when a predetermined state of charge has not been reach or a predetermined state of charge has been exceeded (506); and
  measure a state of charge for each lithium secondary cell or groups of lithium secondary cells after each application of voltage and prevent application of voltage and if a predetermined state of charge is reached for each cell or groups of cells (508) enabling at least partial discharge of one or more lithium secondary cells or groups of lithium secondary cells simultaneously while one or more lithium secondary cells or groups of lithium secondary cells is charging (510).

While these embodiments have been described with emphasis on the embodiments, it should be understood that within the scope of the appended claims, the embodiments might be practiced other than as specifically described herein.

What is claimed is:

1. A battery pack control module for balancing a plurality of lithium secondary cells or groups of lithium secondary cells connected in series, wherein the battery pack control module comprises:
  a controller assembly;
  a disconnect circuit comprising a charge switch and a discharge switch, wherein the disconnect circuit engages the controller assembly and the plurality of lithium secondary cells or groups of lithium secondary cells connected in series;
  a pack sensing circuit connected to the controller assembly and the plurality of lithium secondary cells or groups of lithium secondary cells connected in series, wherein the pack sensing circuit comprises:
    a temperature measuring device;
    a current measuring device; and
    a cell voltage measuring device;
  at least one balancing circuit connected between the plurality of lithium secondary cells or groups of lithium secondary cells connected in series and the controller assembly, wherein each balancing circuit comprises:
  a shunt resistor connected to a bypass switch;
  a power source for charging the plurality of lithium secondary cells or groups of lithium secondary cells further connected to the controller assembly;
  a current limiting resistor connected to the power source for limiting current from the plurality of lithium secondary cells or groups of lithium secondary cells connected in series while charging;
  at least one configuration table containing cell specifications of the lithium secondary cells disposed in configuration memory connected to the controller assembly;
  a protective diode connected to the plurality of lithium secondary cells or groups of lithium secondary cells connected in series and to the at least one disconnect circuit, and the protective diode prevents excessive voltage from developing across the controller assembly;
  computer instructions within the controller assembly for instructing the controller assembly to monitor the state of charge for the plurality of lithium secondary cells or groups of lithium secondary cells connected in series;
  computer instructions within the controller assembly for instructing the controller assembly to control the disconnect circuit in conjunction with control of the balancing circuit and apply voltage from the power source to the charge switch or discharge switch from a lithium secondary cell or groups of lithium secondary cells when a predetermined state of charge has not been reached or is exceeded; and
  computer instructions within the controller assembly for instructing the controller assembly to measure the state of charge for each lithium secondary cells after each application of voltage and if a predetermined state of charge is reached for each lithium secondary cell actuate at least a partial discharge of one or more lithium secondary cells simultaneously, enabling simultaneous discharge of one or more lithium secondary cells while one or more lithium secondary cells is charging, discharging, quiescent, or is in storage.

2. The module of claim 1, wherein the controller assembly comprises an analog controller and a digital controller.

3. The module of claim 2, the digital controller comprises at least one processor.

4. The module of claim 1, wherein the protective diode is a reverse voltage protection diode or a bypass diode.

5. The module of claim 1, further comprising a second diode for balancing the plurality of lithium secondary cells or groups of lithium secondary cells by discharging at least one lithium secondary cell or group of lithium secondary cells or charging at least one lithium secondary cell or group of lithium secondary cells until a balance phase for the connected cells is achieved.

6. The module of claim 1, wherein the configuration memory with cell specifications further comprises computer instructions for instructing the processor to customize cell specifications of the battery pack control module using the cell specifications.

7. The module of claim 1, further comprising a display device in communication with the controller assembly, and wherein the controller assembly further comprises computer instructions for instructing the processor to display the state of charge for each cell on the display device.

8. The module of claim 7, wherein the display device comprises a member of the group consisting of: a plurality of light emitting diodes, a liquid crystal display, a plasma display, and combinations thereof.

9. The module of claim 1, wherein the controller assembly further comprises computer instructions for instructing the processor to display an absolute state of charge by counting coulombs.

10. The module of claim 1, wherein the power source comprises a rechargeable battery, a fuel cell, a solar panel, a hydroelectric source or other electric power supply.

11. The module of claim 1, wherein the power source is at least one capacitor, at least one supercapacitor, at least one other electrochemical cell, or combinations.

12. The module of claim 4, wherein the protective diode is a zener diode connected in series with a current limiting resistor, and wherein the zener diode is disposed between a high charge lithium secondary cell or group of lithium secondary cells and a different charge lithium secondary cell or group of lithium secondary cells, and wherein the zener diode is actuatable by the disconnect circuit.

13. The module of claim 1 wherein the by-pass switch comprises a member selected from the group consisting of: a semiconductor switch, a variable resistor, a mini-micro switch or combinations thereof.

14. The module of claim 1, wherein cell voltage measuring device measures voltage between lithium secondary cells, between groups of lithium secondary cells, or combinations thereof.

15. The module of claim 1, wherein the temperature measuring device, the current measuring device or both are external to the controller assembly.

16. The module of claim 2, wherein the digital controller comprises one or more analog I/O ports, one or more digital I/O ports, and memory with processing logic.

17. The module of claim 1, wherein the computer instructions for controlling the controller assembly include instructions to direct the processor to connect the plurality of lithium secondary cells or groups of lithium secondary cells connected in series to the power supply, to connect the plurality of lithium secondary cells or groups of lithium secondary cells connected in series to a load, or to disconnect the plurality of lithium secondary cells or groups of lithium secondary cells from a load, or combinations thereof.

18. The module of claim 1, further comprising a voltage regulator for powering the controller assembly.

19. A method for extending power duration for lithium secondary cells or groups of lithium secondary cells connected in series, or connected in parallel and then in series, comprising the steps of: monitoring and measuring parameters for lithium secondary cells or groups of lithium secondary cells connected in parallel, or are further connected in series, to determine a state of charge for the lithium secondary cells or groups of lithium secondary cells; limiting current from the plurality of lithium secondary cells or groups of lithium secondary cells connected in parallel, or are further connected in series, to determine a state of charge for lithium secondary cells or groups of lithium secondary cells; using protective diode connected to the plurality of lithium secondary cells or groups of lithium secondary cells connected in series and to the at least one disconnect circuit, and the protective diode prevents excessive voltage from developing across the controller assembly; removing at least a portion of a charge from at least one of the lithium secondary cells or groups of lithium secondary cells to achieve a balanced state of charge for the lithium secondary cells connected in series, or groups of lithium secondary cells connected in series, in a discharge phase, a charge phase, a quiescent phase, and a storage phase using a digital controller to execute computer instructions, wherein the computer instructions instruct a processor comprise the steps of: monitor the state of charge for the lithium secondary cells or groups of lithium secondary cells; control a disconnect circuit connected to a controller assembly while controlling a balancing circuit connected to the lithium secondary cells or groups of lithium secondary cells to apply voltage from a power source to a charge switch that is part of the disconnect circuit; or discharge voltage from a lithium secondary cell or groups of lithium secondary cells when a predetermined state of charge has not been reach or a predetermined state of charge has been exceeded; and measure a state of charge for each lithium secondary cell or groups of lithium secondary cells after each application of voltage and prevent application of voltage and if a predetermined state of charge is reached for each cell or groups of cells enabling at least partial discharge of one or more lithium secondary cells or groups of lithium secondary cell simultaneously while one or more lithium secondary cells or groups of lithium secondary cells is charging.

20. The method of claim 19, wherein the monitoring and measuring further comprises measuring temperature of lithium secondary cells or groups of lithium secondary cells, measuring current of lithium secondary cells or groups of lithium secondary cells, measuring cell voltages of lithium secondary cells or groups of lithium secondary cells, or combinations thereof.

21. The method of claim 19, further comprising using a configuration table to customize the balancing of the state of charge for the lithium secondary cells or groups of lithium secondary cells, or combinations thereof.

22. The method of claim 19, further comprising the step of connecting the plurality of lithium secondary cells or groups of lithium secondary cells together in series to form at least one battery pack system.

23. The method of claim 19, farther comprising the step of preventing excessive voltage from developing across the lithium secondary cells or groups of lithium secondary cells.

24. The method of claim 19, wherein the step of removing a portion of the charge for at least one lithium secondary cell or at least one group of lithium secondary cells until the balance state uses a disconnect circuit and a diode.

25. The method of claim 19, further comprising using a diode to protect the circuit between the cells.

\* \* \* \* \*